(12) United States Patent
Eckel et al.

(10) Patent No.: US 8,969,448 B2
(45) Date of Patent: Mar. 3, 2015

(54) PC/ABS COMPOSITIONS HAVING A GOOD RESISTANCE TO HEAT AND CHEMICALS

(71) Applicant: Bayer Material Science AG, Leverkusen (DE)

(72) Inventors: Thomas Eckel, Dormagen (DE); Andreas Seidel, Dormagen (DE); Martin Haussler, Remscheid (DE); Burkhard Thuermer, Bornheim (DE)

(73) Assignee: Bayer MaterialScience AG, Leverkusen (DE)

( * ) Notice: Subject to any disclaimer, the term of this patent is extended or adjusted under 35 U.S.C. 154(b) by 14 days.

(21) Appl. No.: 13/867,977

(22) Filed: Apr. 22, 2013

(65) Prior Publication Data

US 2013/0289177 A1 Oct. 31, 2013

(30) Foreign Application Priority Data

Apr. 27, 2012 (EP) .................................... 12166035

(51) Int. Cl.
*C08K 5/523* (2006.01)
*C08L 69/00* (2006.01)

(52) U.S. Cl.
CPC ..................................... *C08L 69/00* (2013.01)
USPC ........................................................ 524/127

(58) Field of Classification Search
USPC ........................................................ 524/127
See application file for complete search history.

(56) References Cited

U.S. PATENT DOCUMENTS

| 5,679,759 A | 10/1997 | Wittmann et al. | |
| 6,590,015 B1 * | 7/2003 | Eckel et al. | 524/127 |
| 6,706,788 B2 | 3/2004 | Eckel et al. | |
| 6,753,366 B1 | 6/2004 | Eckel et al. | |
| 2002/0072553 A1 | 6/2002 | Eckel et al. | |
| 2004/0059031 A1 * | 3/2004 | Seidel et al. | 524/121 |
| 2011/0009538 A1 * | 1/2011 | Nakamura et al. | 524/115 |
| 2013/0289192 A1 * | 10/2013 | Seidel et al. | 524/504 |

FOREIGN PATENT DOCUMENTS

| DE | 1170141 B | 5/1964 |
| DE | 1810993 A1 | 6/1970 |
| DE | 2259565 A1 | 7/1974 |
| DE | 2329548 A1 | 1/1975 |
| DE | 2818679 A1 | 10/1979 |
| EP | 0363608 A1 | 4/1990 |
| EP | 0704488 A2 | 4/1996 |
| EP | 747424 A1 | 12/1996 |
| EP | 900827 A2 | 3/1999 |
| EP | 0983315 A1 | 3/2000 |
| EP | 1003809 A1 | 5/2000 |
| JP | 2002 348458 A | 12/2002 |

OTHER PUBLICATIONS

International Search Report and Written Opinion Dated Jul. 15, 2013.

* cited by examiner

*Primary Examiner* — Peter Szekely
(74) *Attorney, Agent, or Firm* — Miles & Stockbridge PC

(57) ABSTRACT

The present invention relates to moulding compositions of polycarbonates and graft polymers and optionally further additives and components, which have, in addition to a high resistance to chemicals, a good resistance to heat, in particular a low tendency towards yellowing and a low tendency towards degradation when exposed to heat.
In a particular, flameproofed embodiment, the after-burn time in a UL94 classification is furthermore reduced.

20 Claims, No Drawings

PC/ABS COMPOSITIONS HAVING A GOOD RESISTANCE TO HEAT AND CHEMICALS

CROSS REFERENCE TO RELATED APPLICATION

This application claims the priority to European Patent Application No. 12166035.1, filed Apr. 27, 2012, the contents of which is incorporated herein by reference in its entirety

BACKGROUND

1. Field of the Invention

The present invention relates to moulding compositions of polycarbonates and graft polymers and optionally further additives and components, which have, in addition to a high resistance to chemicals, a good resistance to heat, in particular a low tendency towards yellowing and a low tendency towards degradation when exposed to heat.

2. Description of Related Art

In a particular, flameproofed embodiment, the after-burn time in a UL94 classification is furthermore reduced.

Thermoplastic moulding compositions of polycarbonates and ABS polymers have been known for a long time.

DE-A 1 170 141 describes readily processable moulding compositions of polycarbonates and graft polymers of monomer mixtures of acrylonitrile and an aromatic vinyl-hydrocarbon on polybutadiene.

DE-A 1 810 993 describes the improved heat resistance of polycarbonate in a blend with ABS graft polymers or copolymers based on α-methylstyrene.

The subject matter of DE-A 22 59 565 and DE-A 23 29 548 is the improved flow line strength of PC/ABS moulding compositions, graft polymers of a certain particle size being in each case used as a constituent of the ABS component in both documents.

DE-A 28 18 679 describes PC/ABS mixtures having a particularly high toughness at low temperatures if the ABS polymer comprises two graft copolymers of different degree of grafting.

EP-A 900 827 discloses impact-modified polycarbonate compositions with improved heat stability comprising emulsion polymers which are substantially free from any basic components which degrade the polycarbonate. According to this application, such polycarbonate compositions which are impact-modified with emulsion polymers, which contain basic impurities due to the preparation, have a lack of heat stability.

EP 0 363 608 describes polymer mixtures of aromatic polycarbonate, styrene-containing copolymer or graft copolymer and oligomeric phosphates as flameproofing additives.

EP 0 704 488 describes moulding compositions of aromatic polycarbonate, styrene-containing copolymers and graft polymers having a specific graft base in certain ratios of amounts. These moulding compositions can optionally be rendered flame-resistant with phosphorus compounds.

EP 747 424 describes thermoplastic resins which comprise phosphate compounds having a molecular weight of from 500 to 2,000 and phosphate compounds having a molecular weight of from 2,300 to 11,000 as flameproofing agents, a large number of thermoplastic resins being listed. The flow properties of the moulding compositions are impaired significantly by the high molecular weights of the phosphorus compounds.

EP 1 003 809 describes PC/ABS moulding compositions which comprise oligomeric phosphorus compounds and graft polymers of a graft base having a certain particle size. These moulding compositions are distinguished by good mechanical properties, in particular also under increased elasticity stress.

EP 0 983 315 describes moulding compositions of aromatic polycarbonate, graft polymer and a flameproofing agent combination of a monomeric and an oligomeric phosphorus compound. These moulding compositions have a high heat distortion point and excellent mechanical properties (notched impact strength and weld strength).

In none of the abovementioned documents is the influence of the content of free, i.e. not chemically bonded, bisphenol A on the heat stability or the tendency towards yellowing of the polycarbonate moulding compositions described, just as little as the combination of these properties with an improved resistance to chemicals is described.

SUMMARY

An object of the present invention was thus to provide polycarbonate moulding compositions which have, in addition to a high resistance to chemicals, a good resistance to heat, in particular a low tendency towards yellowing and a low tendency towards degradation when exposed to heat.

A further object of the present invention was to achieve the abovementioned properties and to reduce the after-burn time in a UL94 classification in flameproofed embodiments.

It has now been found, surprisingly, that the abovementioned properties are obtained if the content of monomeric, i.e. not bonded chemically in the polymer, bisphenol A (BPA) in the polycarbonate moulding composition does not exceed 70 ppm, based on the total moulding composition.

Free, i.e. not chemically bonded, BPA can be introduced into the compositions, for example, as an impurity in the BPA-based polycarbonate or as an impurity in BPA-based flameproofing agents or, however, can also form during exposure of the above-mentioned components to heat.

The moulding compositions of such composition are distinguished by a high resistance to chemicals, a good resistance to heat, in particular a low tendency towards yellowing and a low tendency towards degradation when exposed to heat, and, in the flameproofed embodiment, a reduced after-burn time.

The present invention provides thermoplastic moulding compositions comprising

A) 51.0 to 99.5 parts by wt., preferably 61.0 to 96.5 parts by wt., particularly preferably 71.0 to 86.0 parts by wt. of at least one aromatic polycarbonate or polyester carbonate, B) 0.5 to 49.0 parts by wt., preferably 1.0 to 39.0 parts by wt., particularly preferably 2.0 to 29.0 parts by wt. of at least one graft polymer, C) 0.0-30.0 parts by wt., preferably 1.0-20.0 parts by wt., particularly preferably 3.0-15.0 parts by wt. of vinyl (co) polymer and/or polyalkylene terephthalate, D) 0.0-20.0 parts by wt., preferably 1.0-18.0 parts by wt., particularly preferably 8.0-15.0 parts by wt. of at least one phosphorus-containing flameproofing agent, E) 0.0-40.0 parts by wt., preferably 0.5-10.0 parts by wt., particularly preferably 1.0-6.0 parts by wt. of further conventional additives, wherein the sum of the parts by weight of components A) to E) adds up to 100 parts by weight, and wherein the content of free bisphenol A in the total composition is less than 70 ppm, preferably less than 50 ppm, further preferably less than 30 ppm, and is preferably >0.5 ppm, further preferably >1.0 ppm, particularly preferably >2 ppm.

In a particular embodiment, the invention provides non-flameproofed, thermoplastic moulding compositions comprising A) 51.0 to 99.5 parts by wt., preferably 61.0 to 93.0 parts by wt., particularly preferably 71.0 to 91.0 parts by wt. of at least one aromatic polycarbonate, B) 0.5 to 49.0 parts by wt., preferably 2.5 to 39.0 parts by wt., particularly preferably 5.0 to 35.0 parts by wt. of at least one graft polymer, C) 0.0-40.0 parts by wt., preferably 1.5-30.0 parts by wt., particularly preferably 3.5-20.0 parts by wt. of vinyl (co) polymer and/or polyalkylene terephthalate, E) 0.0-40.0 parts by wt., preferably 0.1-10.0 parts by wt., particularly preferably 0.5-6.0 parts by wt. of further conventional additives, wherein the sum of the parts by weight of components A) to E) adds up to 100 parts by weight, and wherein the content of free bisphenol A in the total composition is less than 70 ppm, preferably less than 50 ppm, further preferably less than 30 ppm, and is preferably >0.5 ppm, further preferably >1.0 ppm, particularly preferably >2 ppm.

DETAILED DESCRIPTION OF A PREFERRED EMBODIMENT

In a particular embodiment, the invention provides flameproofed, thermoplastic moulding compositions comprising A) 61.0 to 95.0 parts by wt., preferably 66.0 to 90.0 parts by wt., particularly preferably 71.0 to 85.0 parts by wt. of at least one aromatic polycarbonate, B) 0.5 to 20.0 parts by wt., preferably 2.0 to 15.0 parts by wt., particularly preferably 5.0 to 12.0 parts by wt. of at least one graft polymer, C) 0.0-20.0 parts by wt., preferably 1.0-15.0 parts by wt., particularly preferably 2.0-10.0 parts by wt. of vinyl (co) polymer and/or polyalkylene terephthalate, D) 1.0-20.0 parts by wt., preferably 2.0-18.0 parts by wt., further preferably 4.0-16.0 parts by wt., particularly preferably 7.0-15.0 parts by wt. of at least one preferably phosphorus-containing flameproofing agent, E) 0.5-20.0 parts by wt., preferably 1.0-15.0 parts by wt., particularly preferably 1.0-10.0 parts by wt. of further conventional additives, wherein the sum of the parts by weight of components A) to E) adds up to 100 parts by weight, and wherein the content of free bisphenol A in the total composition is less than 70 ppm, preferably less than 50 ppm, further preferably less than 30 ppm, and is preferably >0.5 ppm, further preferably >1.0 ppm, particularly preferably >2 ppm.

For determination of the content of free bisphenol A, the sample is dissolved in methylene chloride and reprecipitated with methanol. The polymer content which has precipitated out is filtered off and the filtrate solution is concentrated. The content of free BPA is determined in the concentrated filtrate solution by HPLC with UV detection (external standard).

Particularly preferred moulding compositions comprise as component E), in addition to optional further additives, a mould release agent, e.g. pentaerythritol tetrastearate, in an amount of 0.1 to 1.5 parts by wt., preferably 0.2 to 1.0 part by wt., particularly preferably 0.3 to 0.8 part by wt.

Particularly preferred moulding compositions comprise as component E), in addition to optional further additives, at least one stabilizer, for example chosen from the group of sterically hindered phenols, phosphites and mixtures thereof, and particularly preferably Irganox® B900, in an amount of 0.01 to 0.5 part by wt., preferably 0.03 to 0.4 part by wt., particularly preferably 0.06 to 0.3 part by wt.

Particularly preferred flameproofed moulding compositions comprise as component E), in addition to optional further additives, a fluorinated polyolefin in an amount of 0.05 to 5.0 parts by wt., preferably 0.1 to 2.0 parts by wt., particularly preferably 0.3 to 1.0 part by wt.

The combination of the three abovementioned additives PTFE, pentaerythritol tetrastearate and Irganox B900 is furthermore particularly preferred as component E.

Component A

Aromatic polycarbonates and/or aromatic polyester carbonates according to component A which are suitable according to the invention are known from the literature or can be prepared by processes known from the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the preparation of aromatic polyester carbonates e.g. DE-A 3 007 934).

Aromatic polycarbonates are prepared e.g. by reaction of diphenols with carbonic acid halides, preferably phosgene, and/or with aromatic dicarboxylic acid dihalides, preferably benzenedicarboxylic acid dihalides, by the interfacial process, optionally using chain terminators, for example monophenols, and optionally using branching agents which are trifunctional or more than trifunctional, for example triphenols or tetraphenols. A preparation via a melt polymerization process by reaction of diphenols with, for example, diphenyl carbonate is likewise possible.

Polycarbonates prepared in the interfacial process are preferred according to the invention.

Further preferably, the polycarbonates according to the invention have an OH end group concentration of less than 300 ppm, particularly preferably less than 250 ppm, very preferably less than 200 ppm.

The determination of the OH end group concentration is carried out by means of infrared spectroscopy as described in Horbach, A.; Veiel, U.; Wunderlich, H., Makromolekulare Chemie 1965, volume 88, p. 215-231.

Diphenols for the preparation of the aromatic polycarbonates and/or aromatic polyester carbonates are preferably those of the formula (I)

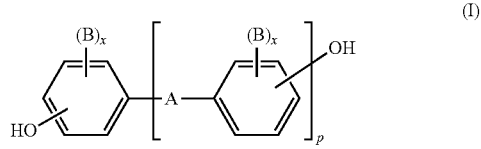

wherein

A is a single bond, $C_1$ to $C_5$-alkylene, $C_2$ to $C_5$-alkylidene, $C_5$ to $C_6$-cycloalkylidene, —O—, —SO—, —CO—, —S—, —SO$_2$—, $C_6$ to $C_{12}$-arylene, on to which further aromatic rings optionally comprising hetero atoms can be fused, or a radical of the formula (II) or (III)

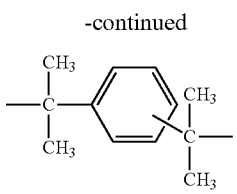
(III)

B is in each case $C_1$ to $C_{12}$-alkyl, preferably methyl, halogen, preferably chlorine and/or bromine, x is in each case independently of each other 0, 1 or 2, p is 1 or 0, and R5 and R6 can be chosen individually for each X1 and independently of each other denote hydrogen or C1 to C6-alkyl, preferably hydrogen, methyl or ethyl, X1 denotes carbon and m denotes an integer from 4 to 7, preferably 4 or 5, with the proviso that on at least one atom X1, R5 and R6 are simultaneously alkyl, preferably methyl or ethyl.

Preferred diphenols are hydroquinone, resorcinol, dihydroxydiphenols, bis-(hydroxyphenyl)-C1-C5-alkanes, bis-(hydroxyphenyl)-C5-C6-cycloalkanes, bis-(hydroxyphenyl) ethers, bis-(hydroxyphenyl)sulfoxides, bis-(hydroxyphenyl) ketones, bis-(hydroxyphenyl)sulfones and α,α-bis-(hydroxyphenyl)-diisopropylbenzenes and derivatives thereof brominated on the nucleus and/or chlorinated on the nucleus.

Particularly preferred diphenols are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and di- and tetrabrominated or -chlorinated derivatives thereof, such as, for example, 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. 2,2-Bis-(4-hydroxyphenyl)-propane (bisphenol A) is particularly preferred.

The diphenols can be employed individually or as any desired mixtures. The diphenols are known from the literature or obtainable by processes known from the literature.

Chain terminators which are suitable for the preparation of the thermoplastic, aromatic polycarbonates are, for example, phenol, p-chlorophenol, p-tert-butylphenol or 2,4,6-tribromophenol, but also long-chain alkylphenols, such as 4-[2-(2,4,4-trimethylpentyl)]-phenol, 4-(1,3-tetramethylbutyl)-phenol according to DE-A 2 842 005 or monoalkylphenols or dialkylphenols having a total of 8 to 20 carbon atoms in the alkyl substituents, such as 3,5-di-tert-butylphenol, p-iso-octylphenol, p-tert-octylphenol, p-dodecylphenol and 2-(3,5-dimethylheptyl)-phenol and 4-(3,5-dimethylheptyl)-phenol. The amount of chain terminators to be employed is in general between 0.5 mol % and 10 mol %, based on the sum of the moles of the particular diphenols employed.

The thermoplastic, aromatic polycarbonates preferably have average weight-average molecular weights (Mw, measured by GPC (gel permeation chromatography with a polycarbonate standard) of from 10,000 to 200,000 g/mol, preferably 15,000 to 80,000 g/mol, further preferably from 23,000 to 32,000, particularly preferably 26,000 to 32,000 g/mol.

The thermoplastic, aromatic polycarbonates can be branched in a known manner, and in particular preferably by incorporation of from 0.05 to 2.0 mol %, based on the sum of the diphenols employed, of compounds which are trifunctional or more than trifunctional, for example those having three and more phenolic groups. Preferably, linear polycarbonates, further preferably based on bisphenol A, are employed.

Both homopolycarbonates and copolycarbonates are suitable. 1 to 25 wt. %, preferably 2.5 to 25 wt. %, based on the total amount of diphenols to be employed, of polydiorganosiloxanes having hydroxyaryloxy end groups can also be employed for the preparation of the copolycarbonates according to the invention according to component A. These are known (U.S. Pat. No. 3,419,634) and can be prepared by processes known from the literature. Copolycarbonates containing polydiorganosiloxane are likewise suitable; the preparation of copolycarbonates containing polydiorganosiloxane is described, for example, in DE-A 3 334 782.

Preferred polycarbonates are, in addition to the bisphenol A homopolycarbonates, the copolycarbonates of bisphenol A with up to 15 mol %, based on the sum of the moles of diphenols, of other diphenols mentioned as preferred or particularly preferred.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and of naphthalene-2,6-dicarboxylic acid.

Mixtures of the diacid dichlorides of isophthalic acid and of terephthalic acid in a ratio of between 1:20 and 20:1 are particularly preferred.

A carbonic acid halide, preferably phosgene, is additionally co-used as a bifunctional acid derivative in the preparation of polyester carbonates.

Possible chain terminators for the preparation of the aromatic polyester carbonates are, in addition to the monophenols already mentioned, also chlorocarbonic acid esters thereof and the acid chlorides of aromatic monocarboxylic acids, which can optionally be substituted by C1 to C22-alkyl groups or by halogen atoms, and aliphatic C2 to C22-monocarboxylic acid chlorides.

The amount of chain terminators is in each case 0.1 to 10 mol %, based on the moles of diphenol in the case of the phenolic chain terminators and on the moles of dicarboxylic acid dichloride in the case of monocarboxylic acid chloride chain terminators.

One or more aromatic hydroxycarboxylic acids can additionally be employed in the preparation of aromatic polyester carbonates.

The aromatic polyester carbonates can be either linear or branched in a known manner (in this context see DE-A 2 940 024 and DE-A 3 007 934), linear polyester carbonates being preferred.

Branching agents which can be used are, for example, carboxylic acid chlorides which are trifunctional or more than trifunctional, such as trimesic acid trichloride, cyanuric acid trichloride, 3,3',4,4'-benzophenonetetracarboxylic acid tetrachloride, 1,4,5,8-naphthalenetetracarboxylic acid tetrachloride or pyromellitic acid tetrachloride, in amounts of from 0.01 to 1.0 mol-% (based on the dicarboxylic acid dichlorides employed), or phenols which are trifunctional or more than trifunctional, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenylisopropyl)-phenol, tetra-(4-hydroxyphenyl)-methane, 2,6-bis(2-hydroxy-5-methylbenzyl)-4-methylphenol, 2-(4-hydroxyphenyl)-2-(2,4-dihydroxyphenyl)-propane, tetra-(4-[4-hydroxyphenylisopropyl]-phenoxy)-methane, 1,4-bis[4,4'-dihydroxytriphenyl)-methyl]-benzene, in amounts of from 0.01 to 1.0 mol %, based on the diphenols employed. Phenolic branching agents can be initially introduced with the diphenols; acid chloride branching agents can be introduced together with the acid dichlorides.

The content of carbonate structural units in the thermoplastic, aromatic polyester carbonates can vary as desired. Preferably, the content of carbonate groups is up to 100 mol %, in particular up to 80 mol %, particularly preferably up to 50 mol %, based on the sum of ester groups and carbonate groups. Both the ester and the carbonate content of the aromatic polyester carbonates can be present in the polycondensate in the form of blocks or in random distribution.

The thermoplastic, aromatic polycarbonates and polyester carbonates can be employed by themselves or in any desired mixture.

Component B

The graft polymers B include e.g. graft polymers having rubber-elastic properties, which are essentially obtainable from at least 2 of the following monomers: chloroprene, buta-1,3-diene, isoprene, styrene, acrylonitrile, ethylene, propylene, vinyl acetate and (meth)acrylic acid esters having 1 to 18 C atoms in the alcohol component; that is to say polymers such as are described e.g. in "Methoden der Organischen Chemie" (Houben-Weyl), vol. 14/1, Georg Thieme-Verlag, Stuttgart 1961, p. 393-406 and in C. B. Bucknall, "Toughened Plastics", Appl. Science Publishers, London 1977.

Particularly preferred polymers B are, for example, ABS polymers (emulsion, bulk and suspension ABS) such as are described e.g. in DE-OS 2 035 390 (=U.S. Pat. No. 3,644,574) or in DE-OS 2 248 242 (=GB 1 409 275) and in Ullmanns, Enzyklopädie der Technischen Chemie, vol. 19 (1980), p. 280 et seq. The gel content of the graft base B.2 is at least 30 wt. %, preferably at least 40 wt. % (measured in toluene).

The graft copolymers B are prepared by free radical polymerization, e.g. by emulsion, suspension, solution or bulk polymerization, preferably by emulsion or bulk polymerization.

Preferred polymers B are partly crosslinked and have gel contents (measured in toluene) of more than 20 wt. %, preferably more than 40 wt. %, in particular more than 60 wt. %.

The gel content is determined at 25° C. in a suitable solvent (M. Hoffmann, H. Krömer, R. Kuhn, Polymeranalytik I and II, Georg Thieme-Verlag, Stuttgart 1977).

Preferred graft polymers B include graft polymers of:
B.1) 5 to 95, preferably 30 to 80 parts by wt. of a mixture of
B.1.1) 50 to 95 parts by wt. of styrene, α-methylstyrene, styrene substituted on the nucleus by methyl, C1-C8-alkyl methacrylate, in particular methyl methacrylate, C1-C8-alkyl acrylate, in particular methyl acrylate, or mixtures of these compounds and
B.1.2) 5 to 50 parts by wt. of acrylonitrile, methacrylonitrile, C1-C8-alkyl methacrylates, in particular methyl methacrylate, C1-C8-alkyl acrylate, in particular methyl acrylate, maleic anhydride, maleimides N-substituted by C1-C4-alkyl or phenyl or mixtures of these compounds on
B.2) 5 to 95, preferably 20 to 70 parts by wt. of a rubber-containing graft base.

Preferably, the graft base has a glass transition temperature below −10° C.

Unless stated otherwise in the present invention, glass transition temperatures are determined by means of dynamic differential calorimetry (DSC) in accordance with the standard DIN EN 61006 at a heating rate of 10 K/min with definition of the Tg as the midpoint temperature (tangent method) and nitrogen as the inert gas.

A graft base based on a polybutadiene rubber is particularly preferred.

Preferred graft polymers B are e.g. polybutadienes, butadiene/styrene copolymers and acrylate rubbers grafted with styrene and/or acrylonitrile and/or (meth)acrylic acid alkyl esters; i.e. copolymers of the type described in DE-OS 1 694 173 (=U.S. Pat. No. 3,564,077); polybutadienes, butadiene/styrene or butadiene/acrylonitrile copolymers, polyisobutenes or polyisoprenes grafted with acrylic or methacrylic acid alkyl esters, vinyl acetate, acrylonitrile, styrene and/or alkylstyrenes, such as are described e.g. in DE-OS 2 348 377 (=U.S. Pat. No. 3,919,353).

Particularly preferred graft polymers B are graft polymers which are obtainable by a grafting reaction of
I. 10 to 70, preferably 15 to 50, in particular 20 to 40 wt. %, based on the graft product, of at least one (meth)acrylic acid ester or 10 to 70, preferably 15 to 50, in particular 20 to 40 wt. % of a mixture of 10 to 50, preferably 20 to 35 wt. %, based on the mixture, of acrylonitrile or (meth)acrylic acid ester and 50 to 90, preferably 65 to 80 wt. %, based on the mixture, of styrene on
II. 30 to 90, preferably 40 to 85, in particular 50 to 80 wt. %, based on the graft product, of a butadiene polymer having at least 50 wt. %, based on II, of butadiene radicals as the graft base.

The gel content of this graft base II is preferably at least 70 wt. % (measured in toluene), the degree of grafting G is 0.15 to 0.55 and the average particle diameter d50 of the graft polymer B is 0.05 to 2, preferably 0.1 to 0.6 μm.

(Meth)acrylic acid esters I are esters of acrylic acid or methacrylic acid and monofunctional alcohols having 1 to 18 C atoms. Methacrylic acid methyl ester, ethyl ester and propyl ester are particularly preferred.

The graft base II can contain, in addition to butadiene radicals, up to 50 wt. %, based on II, of radicals of other ethylenically unsaturated monomers, such as styrene, acrylonitrile, esters of acrylic or methacrylic acid having 1 to 4 C atoms in the alcohol component (such as methyl acrylate, ethyl acrylate, methyl methacrylate, ethyl methacrylate), vinyl esters and/or vinyl ethers. The preferred graft base II preferably comprises pure polybutadiene.

Since as is known the grafting monomers are not necessarily grafted completely on to the graft base during the grafting reaction, according to the invention graft polymers B are also understood as meaning those products which are obtained by polymerization of the grafting monomers in the presence of the graft base.

The degree of grafting G describes the weight ratio of grafted-on grafting monomers to the graft base and is dimensionless.

The average particle size d50 is the diameter above and below which in each case 50 wt. % of the particles lie. It can be determined by means of ultracentrifuge measurements (W. Scholtan, H. Lange, Kolloid, Z. and Z. Polymere 250 (1972), 782-796).

Further preferred graft polymers B are e.g. also graft polymers of
(a) 20 to 90 wt. %, based on B, of acrylate rubber as the graft base and
(b) 10 to 80 wt. %, based on B, of at least one polymerizable, ethylenically unsaturated monomer, homo- or copolymers of which formed in the absence of a) would have a glass transition temperature above 25° C., as grafting monomers.

The graft base of acrylate rubber preferably has a glass transition temperature of below −20° C., preferably below −30° C.

The acrylate rubbers (a) of the polymers B. are preferably polymers of acrylic acid alkyl esters, optionally with up to 40 wt. %, based on (a), of other polymerizable, ethylenically unsaturated monomers. The preferred polymerizable acrylic acid esters include C1-C8-alkyl esters, for example methyl, ethyl, n-butyl, n-octyl and 2-ethylhexyl esters, and mixtures of these monomers.

For crosslinking, monomers having more than one polymerizable double bond can be copolymerized. Preferred examples of crosslinking monomers are esters of unsaturated monocarboxylic acids having 3 to 8 C atoms and unsaturated monofunctional alcohols having 3 to 12 C atoms or saturated polyols having 2 to 4 OH groups and 2 to 20 C atoms, such as e.g. ethylene glycol dimethacrylate, allyl methacrylate; polyunsaturated heterocyclic compounds, such as e.g. trivinyl and triallyl cyanurate; polyfunctional vinyl compounds, such as di- and trivinylbenzenes; but also triallyl phosphate and diallyl phthalate.

Preferred crosslinking monomers are allyl methacrylate, ethylene glycol dimethacrylate, diallyl phthalate and heterocyclic compounds which contain at least 3 ethylenically unsaturated groups.

Particularly preferred crosslinking monomers are the cyclic monomers triallyl cyanurate, triallyl isocyanurate, trivinyl cyanurate, triacryloylhexahydro-s-triazine and triallylbenzenes.

The amount of the crosslinking monomers is preferably 0.02 to 5, in particular 0.05 to 2 wt. %, based on the graft base (a).

In the case of cyclic crosslinking monomers having at least 3 ethylenically unsaturated groups, it is advantageous to limit the amount to less than 1 wt. % of the graft base (a).

Preferred "other" polymerizable, ethylenically unsaturated monomers which can optionally serve for preparation of the graft base (a) in addition to the acrylic acid esters are e.g. acrylonitrile, styrene, α-methylstyrene, acrylamides, vinyl C1-C6-alkyl ethers, methyl methacrylate, butadiene. Preferred acrylate rubbers as the graft base (a) are emulsion polymers which have a gel content of at least 60 wt. %.

Further suitable graft bases are silicone rubbers having grafting-active sites and a gel content of at least 40% (measured in dimethylformamide), such as are described in the Offenlegungsschriften DE 37 04 657, DE 37 04 655, DE 36 31 540 and DE 36 31 539, as well as silicone/acrylate composite rubbers.

Component C

Component C comprises one or more thermoplastic vinyl (co)polymers C.1 and/or polyalkylene terephthalates C.2.

Suitable vinyl (co)polymers C.1 are polymers of at least one monomer from the group of vinylaromatics, vinyl cyanides (unsaturated nitriles), (meth)acrylic acid (C1-C8)-alkyl esters, unsaturated carboxylic acids and derivatives (such as anhydrides and imides) of unsaturated carboxylic acids. (Co) polymers which are suitable in particular are those of C.1.1 50 to 99, preferably 60 to 80 parts by wt. of vinylaromatics and/or vinylaromatics substituted on the nucleus, such as styrene, α-methylstyrene, p-methylstyrene, p-chlorostyrene, and/or (meth)acrylic acid (C1-C8)-alkyl esters, such as methyl methacrylate, ethyl methacrylate, and C.1.2 1 to 50, preferably 20 to 40 parts by wt. of vinyl cyanides (unsaturated nitriles), such as acrylonitrile and methacrylonitrile, and/or (meth)acrylic acid (C1-C8)-alkyl esters, such as methyl methacrylate, n-butyl acrylate, t-butyl acrylate, and/or unsaturated carboxylic acids, such as maleic acid, and/or derivatives, such as anhydrides and imides, of unsaturated carboxylic acids, for example maleic anhydride and N-phenylmaleimide.

The vinyl (co)polymers C.1 are resinous, thermoplastic and rubber-free. The copolymer of C.1.1 styrene and C.1.2 acrylonitrile is particularly preferred.

The (co)polymers according to C.1 are known and can be prepared by free radical polymerization, in particular by emulsion, suspension, solution or bulk polymerization. The (co)polymers preferably have average molecular weights Mw (weight-average, determined by light scattering or sedimentation) of between 15,000 and 200,000.

The polyalkylene terephthalates of component C.2 are reaction products of aromatic dicarboxylic acids or their reactive derivatives, such as dimethyl esters or anhydrides, and aliphatic, cycloaliphatic or araliphatic diols, and mixtures of these reaction products.

Preferred polyalkylene terephthalates comprise at least 80 wt. %, preferably at least 90 wt. %, based on the dicarboxylic acid component, of terephthalic acid radicals and at least 80 wt. %, preferably at least 90 wt. %, based on the diol component, of radicals of ethylene glycol and/or butane-1,4-diol.

The preferred polyalkylene terephthalates can comprise, in addition to terephthalic acid radicals, up to 20 mol %, preferably up to 10 mol % of radicals of other aromatic or cycloaliphatic dicarboxylic acids having 8 to 14 C atoms or aliphatic dicarboxylic acids having 4 to 12 C atoms, such as e.g. radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred polyalkylene terephthalates can comprise, in addition to radicals of ethylene glycol or butane-1,4-diol, up to 20 mol %, preferably up to 10 mol % of other aliphatic diols having 3 to 12 C atoms or cycloaliphatic diols having 6 to 21 C atoms, e.g. radicals of propane-1,3-diol, 2-ethylpropane-1, 3-diol, neopentyl glycol, pentane-1,5-diol, hexane-1,6-diol, cyclohexane-1,4-dimethanol, 3-ethylpentane-2,4-diol, 2-methylpentane-2,4-diol, 2,2,4-trimethylpentane-1,3-diol, 2-ethylhexane-1,3-diol, 2,2-diethylpropane-1,3-diol, hexane-2,5-diol, 1,4-di-(β-hydroxyethoxy)-benzene, 2,2-bis-(4-hydroxycyclohexyl)-propane, 2,4-dihydroxy-1,1,3,3-tetramethylcyclobutane, 2,2-bis-(4-β-hydroxyethoxyphenyl)-propane and 2,2-bis-(4-hydroxypropoxyphenyl)-propane (DE-A 2 407 674, 2 407 776, 2 715 932).

The polyalkylene terephthalates can be branched by incorporation of relatively small amounts of 3- or 4-functional alcohols or 3- or 4-basic carboxylic acids, e.g. in accordance with DE-A 1 900 270 and U.S. Pat. No. 3,692,744. Examples of preferred branching agents are trimesic acid, trimellitic acid, trimethylolethane and -propane and pentaerythritol.

Polyalkylene terephthalates which have been prepared solely from terephthalic acid and reactive derivatives thereof (e.g. dialkyl esters thereof) and ethylene glycol and/or butane-1,4-diol, and mixtures of these polyalkylene terephthalates are particularly preferred.

Mixtures of polyalkylene terephthalates comprise 1 to 50 wt. %, preferably 1 to 30 wt. % of polyethylene terephthalate and 50 to 99 wt. %, preferably 70 to 99 wt. % of polybutylene terephthalate.

The polyalkylene terephthalates preferably used in general have a limiting viscosity of from 0.4 to 1.5 dl/g, preferably 0.5 to 1.2 dl/g, measured in phenol/o-dichlorobenzene (1:1 parts by weight) at 25° C. in an Ubbelohde viscometer.

The polyalkylene terephthalates can be prepared by known methods (see e.g. Kunststoff-Handbuch, volume VIII, p. 695 et seq., Carl-Hanser-Verlag, Munich 1973).

Component D

Phosphorus-containing flameproofing agents D in the context according to the invention are preferably chosen from the groups of mono- and oligomeric phosphoric and phosphonic acid esters, phosphonatamines and phosphazenes, it also being possible to employ mixtures of several components chosen from one or various of these groups as the flameproofing agent. Other halogen-free phosphorus compounds not mentioned specifically here can also be employed by themselves or in any desired combination with other halogen-free phosphorus compounds.

Preferred mono- and oligomeric phosphoric or phosphonic acid esters are phosphorus compounds of the general formula (V)

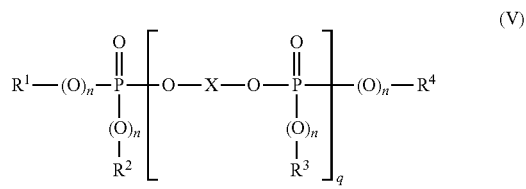

wherein

R1, R2, R3 and R4 independently of each other denote in each case optionally halogenated C1 to C8-alkyl, or C5 to C6-cycloalkyl, C6 to C20-aryl or C7 to C12-aralkyl in each case optionally substituted by alkyl, preferably C1 to C4-alkyl, and/or halogen, preferably chlorine, bromine, n independently of each other denote 0 or 1, q denotes 0 to 30 and X denotes a mono- or polynuclear aromatic radical having 6 to 30 C atoms, or a linear or branched aliphatic radical having 2 to 30 C atoms, which can be substituted by OH and can comprise up to 8 ether bonds.

Preferably, R1, R2, R3 and R4 independently of each another represent C1 to C4-alkyl, phenyl, naphthyl or phenyl-C1-C4-alkyl. The aromatic groups R1, R2, R3 and R4 can in their turn be substituted by halogen groups and/or alkyl groups, preferably chorine, bromine and/or C1 to C4-alkyl. Particularly preferred aryl radicals are cresyl, phenyl, xylenyl, propylphenyl or butylphenyl and the corresponding brominated and chlorinated derivatives thereof.

X in the formula (V) preferably denotes a mono- or polynuclear aromatic radical having 6 to 30 C atoms. This is preferably derived from diphenols of the formula (I).

n in the formula (V) can be, independently of each other, 0 or 1, and preferably n is 1.

q represents integral values from 0 to 30, preferably 0 to 20, particularly preferably 0 to 10, in the case of mixtures average values from 0.8 to 5.0, preferably 1.0 to 3.0, further preferably 1.05 to 2.00 and particularly preferably from 1.08 to 1.60.

X particularly preferably represents

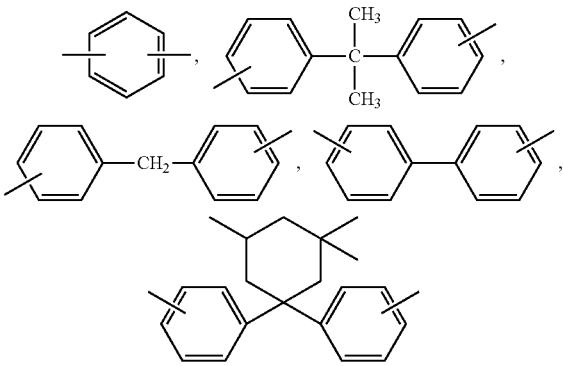

or chlorinated or brominated derivatives thereof, and in particular X is derived from resorcinol, hydroquinone, bisphenol A or diphenylphenol. Particularly preferably, X is derived from bisphenol A.

Phosphorus compounds of the formula (V) are, in particular, tributyl phosphate, triphenyl phosphate, tricresyl phosphate, diphenyl cresyl phosphate, diphenyl octyl phosphate, diphenyl 2-ethylcresyl phosphate, tri-(isopropylphenyl) phosphate, resorcinol-bridged oligophosphate and bisphenol A-bridged oligophosphate. The use of oligomeric phosphoric acid esters of the formula (V) which are derived from bisphenol A is particularly preferred.

Bisphenol A-based oligophosphate according to formula (Va)

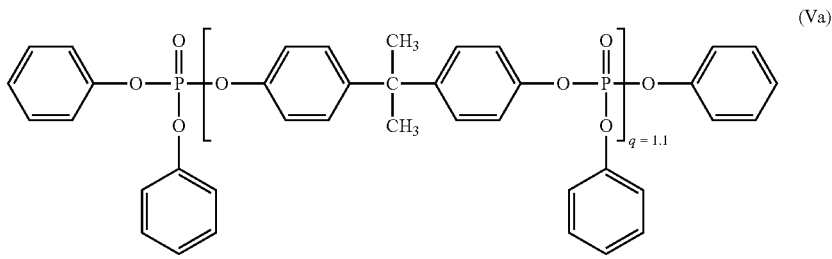

is most preferred as component D.

The phosphorus compounds according to component D are known (cf. e.g. EP-A 0 363 608, EP-A 0 640 655) or can be prepared in an analogous manner by known methods (e.g. Ullmanns Enzyklopädie der technischen Chemie, vol. 18, p. 301 et seq. 1979; Houben-Weyl, Methoden der organischen Chemie, vol. 12/1, p. 43; Beilstein vol. 6, p. 177).

Mixtures of phosphates of different chemical structure and/or of the same chemical structure and different molecular weight can also be employed as component D according to the invention.

Preferably, mixtures of the same structure and different chain length are used, the q value stated being the average q value. The average q value is determined by determining the composition of the phosphorus compound (molecular weight distribution) by means of high pressure liquid chromatography (HPLC) at 40° C. in a mixture of acetonitrile and water (50:50) and calculating the mean values for q therefrom.

Phosphonatamines and phosphazenes such as are described in WO 00/00541 and WO 01/18105 can furthermore be employed as flameproofing agents.

The flameproofing agents can be employed by themselves or in any desired mixture with one another or in a mixture with other flameproofing agents.

If the compositions according to the invention are rendered flame retardant, they preferably additionally comprise an antidripping agent, preferably polytetrafluoroethylene (PTFE).

Component E

The composition can comprise further conventional polymer additives, such as flameproofing synergists, antidripping agents (for example compounds of the substance classes of fluorinated polyolefins, of silicones and aramid fibres), lubricants and mould release agents (for example pentaerythritol tetrastearate), nucleating agents, stabilizers, antistatics (for example conductive carbon blacks, carbon fibres, carbon nanotubes and organic antistatics, such as polyalkylene ethers, alkylsulfonates or polyamide-containing polymers) as well as dyestuffs and pigments.

In particular, polytetrafluoroethylene (PTFE) or PTFE-containing compositions, such as, for example, masterbatches of PTFE with polymers or copolymers comprising styrene or methyl methacrylate, as a powder or as a coagulated mixture, e.g. with component B or C, are employed as antidripping agents.

The fluorinated polyolefins employed as antidripping agents are of high molecular weight and have glass transition temperatures of above −30° C., as a rule of above 100° C., fluorine contents preferably of from 65 to 76, in particular from 70 to 76 wt. %, average particles diameters d50 of from 0.05 to 1,000, preferably 0.08 to 20 µm. In general, the fluorinated polyolefins have a density of from 1.2 to 2.3 g/cm3. Preferred fluorinated polyolefins are polytetrafluoroethylene, polyvinylidene fluoride, tetrafluoroethylene/hexafluoropropylene copolymers and ethylene/tetrafluoroethylene copolymers. The fluorinated polyolefins are known (cf. "Vinyl and Related Polymers" by Schildknecht, John Wiley & Sons, Inc., New York, 1962, page 484-494; "Fluorpolymers" by Wall, Wiley-Interscience, John Wiley & Sons, Inc., New York, volume 13, 1970, page 623-654; "Modern Plastics Encyclopedia", 1970-1971, volume 47, no. 10 A, October 1970, Mc Graw-Hill, Inc., New York, page 134 and 774; "Modern Plastics Encyclopedia", 1975-1976, October 1975, volume 52, no. 10 A, Mc Graw-Hill, Inc., New York, page 27, 28 and 472 and U.S. Pat. Nos. 3,671,487, 3,723,373 and 3 838 092).

Suitable fluorinated polyolefins E which can be employed in powder form are tetrafluoroethylene polymers having an average particle diameter of from 100 to 1,000 µm and densities of from 2.0 g/cm3 to 2.3 g/cm3. Suitable tetrafluoroethylene polymer powders are commercially obtainable products and are available, for example, from DuPont under the trade name Teflon®.

Sterically hindered phenols and phosphites or mixtures thereof, such as, for example, Irganox© B900 (BASF), are preferably used as stabilizers according to component E. Pentaerythritol tetrastearate is preferably used as a mould release agent.

In a further preferred embodiment sterically hindered phenols and phosphites or mixtures thereof, mould release agents and pigments, preferably carbon black or titanium dioxide, are employed as additives.

Component E also includes reinforcing and non-reinforcing fillers. Examples of reinforcing fillers are glass spheres, mica, silicates, quartz, talc, titanium dioxide, wollastonite, and pyrogenic or precipitated silicas having BET surface areas of at least 50 m2/g (in accordance with DIN 66131/2). Talc is particularly preferred as a filler.

In an alternative embodiment, very finely divided inorganic powders can be employed.

The very finely divided inorganic powders preferably comprise oxides, phosphates, hydroxides, preferably TiO2, SiO2, SnO2, ZnO, ZnS, boehmite, ZrO2, Al2O3, aluminium phosphates, iron oxides, furthermore TiN, WC, AlO(OH), Sb2O3, iron oxides, NaSO4, vanadium oxides, zinc borate, silicates, such as Al silicates, Mg silicates, one-, two-, three-dimensional silicates. Mixtures and doped compounds can likewise be used.

These nanoscale particles can furthermore be surface-modified with organic molecules in order to achieve a better compatibility with the polymers. Hydrophobic or hydrophilic surfaces can be generated in this manner. Hydrate-containing aluminium oxides, e.g. boehmite or TiO2, are particularly preferred.

The average particle diameters of the nanoparticles are less than 200 nm, preferably less than 150 nm, in particular 1 to 100 nm. Particle size and particle diameter always means the average particle diameter d50 determined by ultracentrifuge measurements in accordance with W. Scholtan et al., Kolloid-Z. and Z. Polymere 250 (1972), p. 782-796.

The moulding compositions according to the invention comprising components A to D and optionally further known additives E, such as stabilizers, dyestuffs, pigments, lubricants and mould release agents, nucleating agents and antistatics, are prepared by mixing the particular constituents in a known manner and subjecting the mixture to melt compounding or melt extrusion at temperatures of from 200° C. to 330° C. in conventional units, such as internal kneaders, extruders and twin-screw extruders.

The present invention therefore also provides a process for the preparation of thermoplastic moulding compositions comprising components A to E, which are subjected to melt compounding or melt extrusion at temperatures of from 200 to 330° C. in conventional units after mixing has taken place.

The mixing of the individual constituents can be carried out in a known manner either successively or simultaneously, and in particular either at about 20° C. (room temperature) or at a higher temperature.

The moulding compositions of the present invention can be used for the production of all types of shaped bodies. In particular, shaped bodies can be produced by injection moulding. Examples of shaped bodies which can be produced are: housing parts of any type, e.g. for domestic appliances, such as TV and HiFi equipment, coffee machines, mixers, office machines, such as monitors or printers, or cover sheets for the construction sector and parts for the motor vehicle sector. They are moreover employed in the field of electrical engineering, because they have very good electrical properties.

The moulding compositions are particularly suitable for the production of thin-walled housing parts in the electrical and electronics sector.

A further form of processing is the production of shaped bodies by blow moulding or by thermoforming from previously produced sheets or films.

Preparation and Testing of the Moulding Compositions

The starting substances listed in Table 1 are compounded and granulated on a twin-screw extruder (ZSK-25) (Werner and Pfleiderer) at a speed of rotation of 225 rpm and a throughput of 20 kg/h at a melt temperature measured at the die exit of 260° C. The finished granules are processed to the corresponding test specimens on an injection moulding machine (unless noted otherwise in Tables 1 and 2, the melt temperature of flameproofed compositions was 240° C. and of non-flameproofed compositions 260° C.; mould temperature 80° C., flow front speed 240 mm/s)

The following methods were used for characterization of the properties of the test specimens:

The melt flowability (MVR) is evaluated with the aid of the melt volume flow rate (MVR) measured in accordance with ISO 1133 at a temperature of 240° C. (flameproofed) or 260° C. (non-flameproofed) and with a plunger load of 5 kg.

The burning properties are measured in accordance with UL 94V on bars of dimensions 127×12.7×1.5 mm.

The ESC properties were measured in accordance with ISO 4599 (environmental stress cracking (ESC) test) at room temperature (23° C.) and at 2.4% edge fibre elongation in a hand cream (Sebamed® hand+nail balsam based on water, PPG-2, myristyl ether propionate, hydrogenated coconut glycerides, glycerol, glyceryl cocoates, hydrogenated coconut oil, sorbitol, panthenol and ceteareth-25).

The heat distortion point was measured in accordance with DIN ISO 306 (Vicat softening temperature, method B with a 50 N load and a heating rate of 120 K/h) on a test bar of dimensions 80 mm×10 mm×4 mm injection moulded on one side.

The yellowness index (YI) is determined on coloured sample sheets (MPL) of dimensions 60×40×2 mm in accordance with the ASTM standard E-313-96 (light type: C, observer: 2°, measurement opening: large area value) from the equation YI=(128X−106Z)/Y, where X, Y, Z=colour coordinates according to DIN 5033. The coloured sample sheets were injection moulded at 310° C. for flameproofed moulding compositions and 320° C. for non-flameproofed moulding compositions.

The change (in percent) of the MVR measured in accordance with ISO 1133 at 260° C. for non-flameproofed and at 240° C. for flameproofed PC/ABS compositions with a plunger load of 5 kg and a 15-minute dwell time of the melt with exclusion of air at a temperature of 300° C. serves as a measure of the processing stability of the compositions prepared in this way. The resulting parameter ΔMVR(proc.) is calculated from the following formula.

$$\Delta MVR(proc.) = \frac{MVR(\text{before melt storage}) - MVR(\text{before storage})}{MVR(\text{before storage})} \cdot 100\%$$

The following examples serve to explain the invention further.

Component A-1

Linear polycarbonate based on bisphenol A prepared by the interfacial process and having a weight-average molecular weight $\overline{M}_w$ of 27,000 g/mol (determined by GPC in methylene chloride with polycarbonate as the standard). The BPA content of the polycarbonate A-1 employed was 3 ppm. These low BPA contents are obtained by degassing conventional polycarbonate on an extruder at temperatures above 300° C. applying a vacuum, and thus evaporating out the BPA, which is volatile under these conditions. Component A-1 has an OH end group content of 150 ppm.

Component A-2

Linear polycarbonate based on bisphenol A prepared by the melt process and having a weight-average molecular weight $\overline{M}_w$ of 27,000 g/mol (determined by GPC in methylene chloride with polycarbonate as the standard) (BPA content 32 ppm). Component A-2 has an OH end group content of 480 ppm.

Component B-1

ABS graft polymer, precipitated under acid conditions, having a core-shell structure prepared by emulsion polymerization of 43 wt. %, based on the ABS polymer, of a mixture of 28 wt. % of acrylonitrile and 72 wt. % of styrene in the presence of 57 wt. %, based on the ABS polymer, of a polybutadiene rubber crosslinked in particle form (average particle diameter $d_{50}$=0.35 μm).

Component B-2

ABS graft polymer, precipitated under basic conditions, having a core-shell structure prepared by emulsion polymerization of 50 wt. %, based on the ABS polymer, of a mixture of 23 wt. % of acrylonitrile and 77 wt. % of styrene in the presence of 50 wt. %, based on the ABS polymer, of a polybutadiene rubber crosslinked in particle form (average particle diameter $d_{50}$=0.25 μm).

Component C

Copolymer of 77 wt. % of styrene and 23 wt. % of acrylonitrile having a weight-average molecular weight Mw of 130,000 g/mol (determined by GPC), prepared by the bulk process.

Component D

Oligophosphate based on bisphenol A

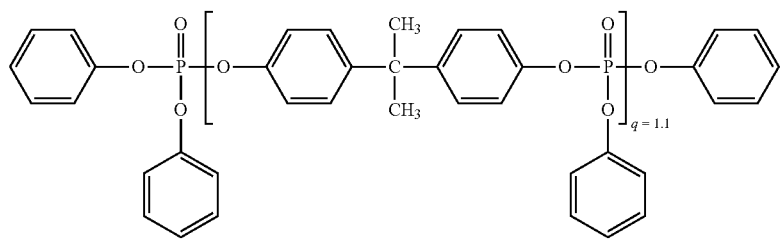

Component E-1

Coagulated mixture of emulsions of fluorinated polyolefins with emulsions of a copolymer based on styrene/acrylonitrile (Cycolac INP 449 from Sabic).

Component E-2

Pentaerythritol tetrastearate as a lubricant/mould release agent

Component E-3

Phosphite stabilizer, Irganox® B900 (mixture of 80% Irgafos® 168 and 20% Irganox® 1076; BASF AG; Ludwigshafen/Irgafos® 168 (tris(2,4-di-tert-butyl-phenyl)phosphite)/Irganox® 1076 (2,6-di-tert-butyl-4-(octadecanoxycarbonylethyl)phenol)

Component E-4

Pural 200 (very finely divided aluminium oxide hydroxide (Condea, Hamburg, Germany) having an average particle size of the material of 50 nm) is employed as an additional stabilizer.

TABLE 1

Composition and properties of the non-flameproofed moulding compositions

|  | Ex. 1 | Ex. 2 |
|---|---|---|
| Components (parts by wt.) | | |
| A1 | 70.0 | |
| A2 | | 70.0 |
| B | 15.0 | 15.0 |
| C2 | 15.0 | 15.0 |
| E-2 | 0.5 | 0.5 |
| E-3 | 0.1 | 0.1 |
| BPA content measured [ppm] | 17 | 76 |
| Properties | | |
| Vicat B 120 | 130 | 129 |
| MVR 260° C./5 kg [ccm/10 min] | 16.7 | 26.7 |
| MVR 260° C./5 kg after heat storage at 300° C./15 min [ccm/10 min] | 38.7 | 96.5 |
| delta MVR after heat storage at 300° C./15 min [%] | 132 | 261 |
| ESC test (hand lotion), 2.4%, time to fracture, 260° C. [h] | 18.0 | 5.3 |
| Yellowness index on MPL 320° C. | 22.3 | 39.5 |

It can be seen from Table 1 that the composition according to the invention according to Example 1 has a lower increase in the melt flow rate after storage at 300° C., that is to say a higher heat stability of the polycarbonate molecular weight, compared with Example 2. The resistance to chemicals in the hand cream investigated is also significantly better. At the same time the yellowness index of the low-BPA composition at high processing temperatures is lower. Higher BPA contents thus lead to deteriorated technical properties in PC/ABS compositions.

The examples in Table 1 moreover show that when graft polymers according to component B which have been precipitated under basic conditions are used in the compositions according to the invention which have not been rendered flame resistant, if polycarbonate which has been prepared by the interfacial process is used, the content of free BPA surprisingly increases significantly less during the compounding (from 2 ppm originating from the polycarbonate to 17 ppm measured in the compounded composition, that is to say by 15 ppm) than if polycarbonate which has been prepared by the melt polymerization process is used (from 22 ppm originating from the polycarbonate to 76 ppm measured in the compounded composition, that is to say by 54 ppm). In the case of compositions which have not been rendered flame resistant and in which a graft polymer which has been precipitated under basic conditions or which is contaminated with base is employed. the use of polycarbonate prepared by the interfacial process is thus particularly preferred.

TABLE 2

Composition and properties of the flameproofed moulding compositions

|  | Ex. 3 | Ex. 4 | Ex. 5 | Ex. 6 | Ex. 7 (comp.) | Ex. 8 (comp.) | Ex. 9 (comp.) | Ex. 10 (comp.) |
|---|---|---|---|---|---|---|---|---|
| Components (parts by wt.) | | | | | | | | |
| A-1 | 77.5 | 77.5 | 77.5 | 77.5 | 77.5 | 77.5 | 77.5 | 77.5 |
| B-1 | 3.5 | 3.5 | 3.5 | 3.5 | 3.5 | 3.5 | 3.5 | 3.5 |
| C | 7.7 | 7.7 | 7.7 | 7.7 | 7.7 | 7.7 | 7.7 | 7.7 |
| D | 9.7 | 9.7 | 9.7 | 9.7 | 9.7 | 9.7 | 9.7 | 9.7 |
| E-1 | 0.8 | 0.8 | 0.8 | 0.8 | 0.8 | 0.8 | 0.8 | 0.8 |
| E-2 | 0.4 | 0.4 | 0.4 | 0.4 | 0.4 | 0.4 | 0.4 | 0.4 |
| E-3 | 0.1 | 0.1 | 0.1 | 0.1 | 0.1 | 0.1 | 0.1 | 0.1 |
| E-4 | 0.3 | 0.3 | 0.3 | 0.3 | 0.3 | 0.3 | 0.3 | 0.3 |
| BPA content measured [ppm] | 3 | 22 | 49 | 63 | 96 | 114 | 153 | 207 |
| BPA added [ppm] | 0 | 20 | 40 | 60 | 80 | 100 | 150 | 200 |
| Properties | | | | | | | | |
| Vicat B 120 | 109 | 109 | 109 | 109 | 109 | 109 | 109 | 109 |
| UL 94 V at 1.5 mm (7 d/70° C.) thickness/total after-burn time | V-0/7 s | V-0/7 s | V-0/8 s | V-0/8 s | V-0/10 s | V-0/11 s | V-0/11 s | V-0/12 s |
| MVR 240° C./5 kg [ccm/10 min] | 10.71 | 10.80 | 10.97 | 11.10 | 11.30 | 11.40 | 11.50 | 11.70 |
| MVR 240° C./5 min after heat storage at 300° C./15 min [ccm/10 min] | 15.90 | 16.90 | 17.80 | 18.30 | 19.10 | 19.40 | 19.90 | 20.70 |
| delta MVR after heat storage at 300° C./15 min [%] | 48.4 | 56.4 | 62.2 | 64.8 | 69.0 | 70.2 | 73.0 | 76.9 |
| ESC test (hand cream), 2.4%, time to fracture, 260° C. [h:min:sec] | 85:45:00 | 83:40:00 | 83:15:00 | 82:25:00 | 81:10:00 | 75:35:00 | 74:45:00 | 70:00:00 |
| Yellowness index on MPL 310° C. | 29.98 | 31.16 | 32.15 | 33.18 | 33.22 | 33.42 | 33.57 | 38.05 |

In principle, free, i.e. not chemically bonded, BPA can be introduced into the compositions, for example, as an impurity in the BPA-based polycarbonate or as an impurity in BPA-based flameproofing agents, or can also be formed during exposure of the above-mentioned components to heat. In Examples 4-6 according to the invention and in Comparative Examples 7-10, defined low contents of BPA were added to the low-BPA polycarbonate A-1 in order to investigate the influence of BPA. All the moulding compositions were prepared under gentle conditions, in order not to generate BPA additionally and in an uncontrolled manner by decomposition of polycarbonate in the moulding compositions.

The properties of flameproofed PC/ABS compositions having various BPA contents are summarized in Table 2. In the flameproofed compositions also, it becomes clear that the compositions according to the invention according to Examples 3-6 have lower melt viscosities and lower increases in the melt viscosities after storage at 300° C., that is to say significantly higher heat stabilities, compared with Examples 7-10. The resistance to chemicals in the hand cream investigated is also significantly better. At the same time the yellowness index of the low-BPA compositions is lower. Higher BPA contents thus lead to deteriorated technical properties in PC/ABS compositions, while lower BPA contents of less than 70 ppm surprisingly lead to significantly better properties.

The invention claimed is:

1. A thermoplastic moulding composition comprising:
   A) from 51.0 to 99.5 parts by wt. of at least one aromatic polycarbonate,
   B) from 0.5 to 49.0 parts by wt. of at least one graft polymer,
   C) from 0.0-30.0 parts by wt. of vinyl (co)polymer and/or polyalkylene terephthalate,
   D) from 0.0-20.0 parts by wt. of at least one phosphorus-containing flameproofing agent,
   E) from 0.0-40.0 parts by wt. of one or more additives,
      wherein the sum of the parts by weight of components A) to E) adds up to 100 parts by weight,
      wherein the content of free bisphenol A in the composition is not more than 70 ppm and is at least 0.5 ppm, and
      wherein component B) is a graft polymer which has been precipitated under basic conditions and/or which is contaminated by base.

2. The moulding composition according to claim 1, comprising:
   A) from 51.0 to 99.5 parts by wt. of at least one aromatic polycarbonate,
   B) from 0.5 to 49.0 parts by wt. of at least one graft polymer,
   C) from 0.0-30.0 parts by wt. of vinyl (co)polymer and/or polyalkylene terephthalate,
   E) from 0.0-40.0 parts by wt. of one or more additives,
      wherein the sum of the parts by weight of components A) to E) adds up to 100 parts by weight, and
      wherein the content of free bisphenol A in the composition is not more than 70 ppm and is at least 0.5 ppm, and
      wherein the moulding composition is free from component D.

3. The moulding composition according to claim 1, comprising:
   A) from 61.0 to 95.0 parts by wt. of at least one aromatic polycarbonate,
   B) from 0.5 to 20.0 parts by wt. of at least one graft polymer,
   C) from 0.0 to 20.0 parts by wt. of vinyl (co)polymer and/or polyalkylene terephthalate,
   D) from 1.0 to 20.0 parts by wt. of at least one phosphorus-containing flameproofing agent,
   E) from 0.5 to 20.0 parts by wt. of one or more additives,
      wherein the sum of the parts by weight of components A) to E) adds up to 100 parts by weight, and
      wherein the content of free bisphenol A in the composition is not more than 70 ppm and is at least 0.5 ppm.

4. The moulding composition according to claim 1, wherein said content of free bisphenol A in the composition is not more than 50 ppm and is at least 0.5 ppm.

5. The moulding composition according to claim 1, wherein said content of free bisphenol A in the composition is not more than 30 ppm and is at least 0.5 ppm.

6. The moulding composition according to claim 1, wherein said component A has a weight-average molecular weight $M_{W\,of\,from}$ 26,000 to 32,000 g/mol.

7. The moulding composition according to claim 1, wherein said component A has an OH end group concentration of not more than 200 ppm.

8. The moulding composition according to claim 7, wherein the moulding composition comprises no component D.

9. The moulding composition according to claim 1, wherein said moulding composition comprises as component E), in addition to optional further additives, at least one stabilizer in a concentration of from 0.01 to 0.5 part by wt.

10. The moulding composition according to claim 1, wherein said moulding composition comprises as component E), in addition to optional further additives, a fluorinated polyolefin in a concentration of from 0.05 to 5.0 parts by wt.

11. The moulding composition according to claim 1, wherein the phosphorus-containing flameproofing agent (D) is present and comprises a flameproofing agent of formula (V)

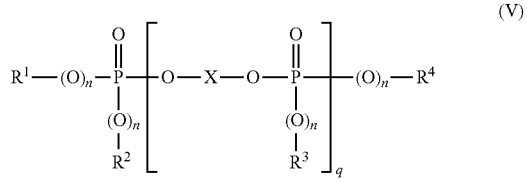

wherein
$R^1$, $R^2$, $R^3$ and $R^4$ independently of each other denote in each case optionally halogenated $C_1$ to $C_8$-alkyl, or $C_5$ to $C_6$-cycloalkyl, $C_6$ to $C_{20}$-aryl or $C_7$ to $C_{12}$-aralkyl in each case optionally substituted by alkyl, optionally $C_1$ to $C_4$-alkyl, and/or halogen, optionally chlorine, bromine,
n independently of each other denote 0 or 1
q denotes from 0.80 to 5.00 and
X denotes a mono- or polynuclear aromatic radical having from 6 to 30 C atoms, or a linear or branched aliphatic radical having from 2 to 30 C atoms, which can be substituted by OH and can comprise up to 8 ether bonds.

12. The moulding composition according to claim 11, wherein X in formula (V) represents bisphenol A.

13. The moulding composition according to claim 1, comprising a graft polymer of:
   B.1) from 5 to 95 parts by wt. of a mixture of,
      B.1.1) from 50 to 95 parts by wt. of styrene, α-methylstyrene, styrene substituted on the nucleus by methyl, $C_1$-$C_8$-alkyl methacrylate, $C_1$-$C_8$-alkyl acrylate, and/or mixtures thereof, and B.1.2) from 5 to 50 parts by wt. of acrylonitrile, methacrylonitrile, $C_1$-$C_8$-alkyl methacrylates, $C_1$-$C_8$-alkyl acrylate, maleic anhydride, maleimides N-substituted by $C_1$-$C_4$-alkyl or phenyl and/or mixtures thereof on, B.2) from 5 to 95 parts by wt. of a rubber-containing graft base.

14. The moulding composition according to claim 13, wherein said rubber-containing graft base B.2 comprises one or more of diene rubbers, acrylate rubbers, silicone rubbers, silicone/acrylate composite rubbers and/or ethylene/propylene/diene rubbers.

15. A composition according to claim 1, comprising as component E, at least one additive selected from the group consisting of flameproofing synergists, antidripping agents, lubricants and mould release agents, nucleating agents, stabilizers, antistatics, dyestuffs and pigments.

16. A shaped body produced from a moulding composition according to claim 1.

17. The moulding composition according to claim 1, wherein component B) is a graft polymer which has been precipitated under basic conditions.

18. The moulding composition according to claim 1, wherein component B) is a graft polymer which is contaminated by base.

19. The moulding composition according to claim 2, wherein component B) is a graft polymer which has been precipitated under basic conditions.

20. The moulding composition according to claim 2, wherein component B) is a graft polymer which is contaminated by base.

* * * * *